(12) United States Patent
Hao et al.

(10) Patent No.: US 6,314,453 B1
(45) Date of Patent: Nov. 6, 2001

(54) METHOD FOR SHARING AND EXECUTING INACCESSIBLE DYNAMIC PROCESSES FOR REPLICA CONSISTENCY AMONG A PLURALITY OF EXISTING APPLICATIONS

(75) Inventors: Ming C. Hao, Palo Alto; Joseph S. Sventek, Oakland, both of CA (US); Todd M. Spencer, Ft. Collins, CO (US); Alan H. Karp, Palo Alto, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/251,367

(22) Filed: Feb. 17, 1999

(51) Int. Cl.[7] ....................................... G06F 13/00
(52) U.S. Cl. ........................ 709/205; 709/204; 709/201
(58) Field of Search ................................... 709/201, 204, 709/205

(56) References Cited

U.S. PATENT DOCUMENTS

| | | | |
|---|---|---|---|
| 5,796,999 | * | 8/1998 | Azagury et al. ................. 707/10 |
| 5,812,773 | * | 9/1998 | Norin ................................ 709/204 |
| 5,828,866 | | 10/1998 | Hao et al. ......................... 703/7 |
| 6,058,416 | * | 5/2000 | Mukherjee et al. ............. 709/203 |
| 6,061,740 | * | 5/2000 | Ferguson et al. ............... 709/246 |
| 6,195,685 | * | 2/2001 | Mukherjee et al. ............. 709/205 |

OTHER PUBLICATIONS

Altenhofen et al., "The BERKOM Multimedia Collaberation Service", ACM Multimedia 93 (1993) pp. 457–463.

Gutekunst et al., "A Distributed and Policy–Free General–Purpose Shared Window System", IEEE Transactions on Networking, vol. 3, No. 1, pp. 51–61 (1995).

* cited by examiner

*Primary Examiner*—Kenneth R. Coulter

(57) ABSTRACT

A system for and method of sharing and executing inaccessible dynamic processes in replicated architecture networks to ensure that local activities are executed concurrently at remote workstations in a shared server-client network without the need for application modification in the system. The invention provides for sharing and executing inaccessible dynamic existing processes for replica consistency among multiple applications in the shared network. The invention provides for use at each workstation an application encapsulator having a listener to observe input events representative of process state changes. Each encapsulator also includes a mapper that operates with an associator for creating hierarchial tree structures to provide concurrent execution among all participant workstations. The invention uses a replica when an accessible process becomes inaccessible for multicasting input events to all participant workstations to maintain replica consistency among the plurality of applications. The invention is preferably used in engineering systems that include 3-D CAD/CAM graphical intensive applications and selectively with text/spreadsheet applications.

10 Claims, 4 Drawing Sheets

METHOD FOR SHARING AND EXECUTING INACCESSIBLE DYNAMIC PROCESSES FOR REPLICA CONSISTENCY AMONG A PLURALITY OF EXISTING APPLICATIONS

BACKGROUND OF THE INVENTION

1. Field of Invention

This invention relates generally to computer-aided design/computer-aided manufacturing (CAD/CAM), multimedia, or any other system that supports substantially concurrent viewing and the ability to change electronically captured multidimensional graphics or text by multiple users and, more particularly, to a system for and method of sharing and executing inaccessible dynamic processes for replica consistency among multiple applications in a shared network.

2. Discussion of Related Art

Industries that manufacture motor vehicles, airplanes and other complex mechanical equipment require designers and engineers to work concurrently on the same large complex design. The ability to work concurrently on the same design allows multiple users to collaborate on design changes in real-time both reducing overall design time and improving the quality of the final designed product.

Computer systems allow designers and engineers to electronically capture and manipulate multidimensional design graphics. The computer software that electronically captures, displays and manipulates graphics displayed on a computer screen is referred to generally as an application program or application. For more than one user to view or work on the same electronically captured 3-D intensive graphics, text, or numbers at the same time, the application must be shared with each user workstation site. The shared application should provide concurrent and consistent views of the same design graphics in real-time at remote user workstations. This changing design trend from sequentially to concurrently processed design efforts can improve productivity. To address this evolution, systems and methods must be capable of simultaneously sharing and managing dynamic execution of multiple existing applications at remote workstations.

For graphical user interfaces (GUIs), most applications support two types of window processes as taught in Altenhofen et al., "The BERKOM Multimedia Collaboration Service," ACM Multimedia 93 (1993); Gutekunst et al., "A Distributed and Policy-Free General-Purpose Shared Window System," IEEE (1995), pages 51–61; and Nye, "XLib Programming Manual," O'Reilly & Associates, Inc. (1992). A first window process-type is an accessible or static window process, which is directly accessible by use of an input device such as a keyboard or pointing device, for example, virtual buttons or sliders. A second window process-type is an inaccessible or hidden window process, for example, pop-up or pull-down menu items, which are generally not directly accessible. An inaccessible process refers to any hidden process such as menu items that cannot dynamically receive events managed by other processes. To collaborate using existing applications, designers must have the capability to share both types of window processes.

The capability to control and execute inaccessible dynamic application processes at remote workstations by sharing replicated existing applications does not exist. The present invention provides a solution for this problem.

SUMMARY OF THE INVENTION

The invention provides a system for and method of sharing inaccessible dynamic processes among multiple workstations for concurrent use. The system includes an associater and multiple application encapsulators which each encapsulate an existing application. Each application encapsulator includes a listener, a mapper, and a replica. When an input event triggers an inaccessible process, for example, a pop-up or a pull-down menu, on one application, known as the floor holder, the process appears on the other applications on participant remote workstations. Through the listener, the mapper, and the replica, a floor holder application pop-up cooperatively functions with the associater to maintain consistency among the multiple existing applications. The system and method are installed in the server-client network without relinking or otherwise modifying existing applications or systems at different workstations. This allows for improved system functionality, and for unmodified use of a wide variety of existing CAD/CAM design tools. Thus, the invention is adaptable for use with shared graphics, multimedia applications, or real-time integration systems.

Some of the advantages of the present invention include: sharing dynamically inaccessible processes at remote workstations; providing shared information between existing applications; triggering concurrent pop-up menu function execution; providing shared, consistent views in real-time 3-D CAD/CAM graphic intensive design applications; requiring relatively low network bandwidth requirements for implementation; and automatically ensuring real-time 3-D graphical consistency among multiple graphic applications.

BRIEF DESCRIPTION OF THE DRAWING

The foregoing and other objects, features, and advantages of the present invention will become more readily apparent from the following detailed description of a preferred embodiment of the invention, when read in conjunction with the accompanying drawing, wherein.

DETAILED DESCRIPTION OF THE PREFERRED EMBODIMENTS

The present invention preferably is used in a multiple client-server network and can be implemented by software, hardware, or a combination of both. The invention provides consistent views among existing application displays at individual workstations before further action occurs in real-time. A preferred use of the invention is sharing 3D-graphic intensive designs that include inaccessible processes among multiple sites. Further, the invention can be used for remote diagnostics. It assures that users collaborate in a consistent manner and process identical input events and inaccessible processes over the network. Input events can be motions of a pointing device, keystrokes on a keyboard, or other user defined inputs at a workstation.

Figure 1:
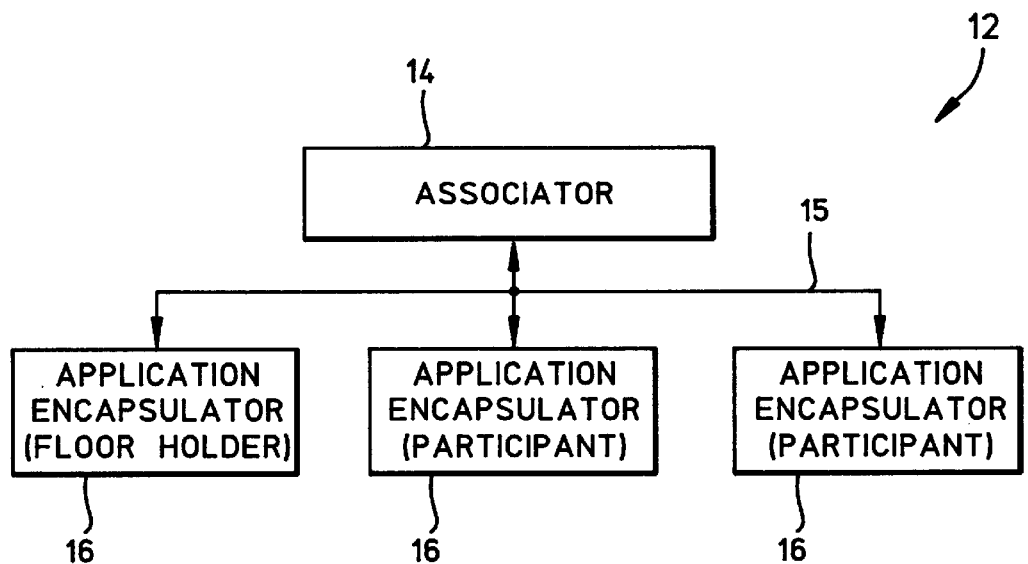
FIG. 1 is a block diagram of a system for sharing an inaccessible dynamic process among multiple workstations according to the present invention.

Referring now to the drawing, and more particularly to FIG. 1, a block diagram of a system 12 for sharing an inaccessible dynamic process among multiple workstations according to the present invention is shown. The system includes an associator 14, a network 15, such as a local area network (LAN), and a plurality of application encapsulators 16 running on platforms such as workstations. Each workstation includes CAD/CAM, multimedia, word processing, spread sheet, or other existing applications where it is desirable to display multiple replicated views in real-time. An example of a 3-D graphical intensive application system is made by IBM Corporation and referred to as CATIA. The invention employs a mechanism that receives input events and executes these events on inaccessible processes on participating workstations. For reference purposes, the particular application encapsulator that receives the input event will be designated the floor holder and all of the other encapsulators will be designated as participants. This mechanism allows for shared and managed information transmissions in the system by a floor holder workstation that dynamically executes these hidden processes at the remote participant workstations.

Figure 2:
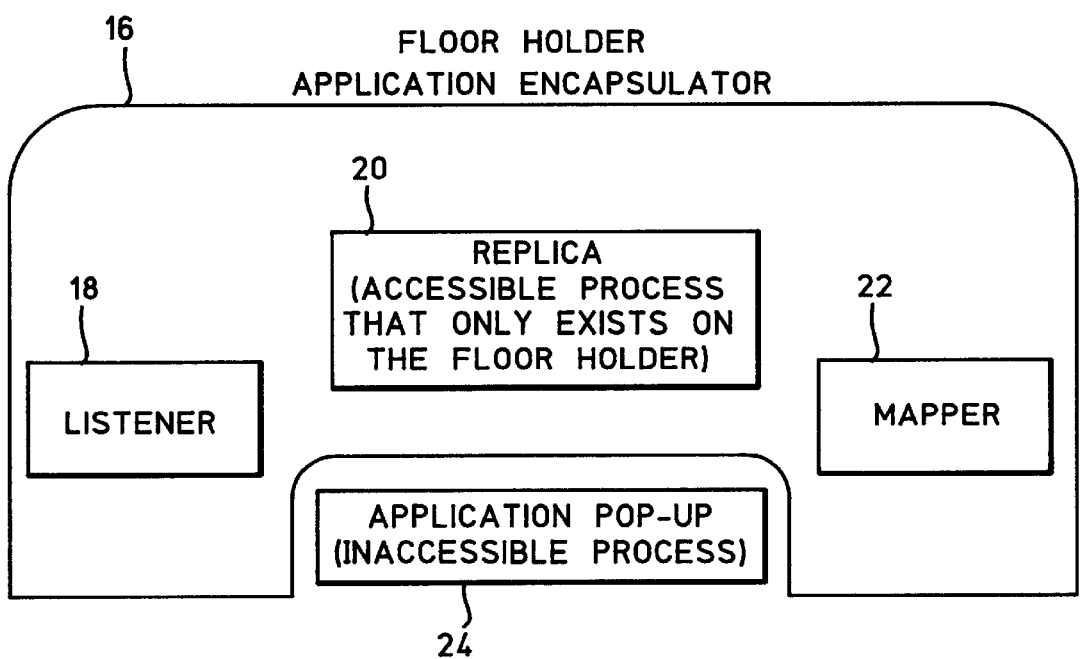
FIG. 2 is a detailed block diagram of an application encapsulator of FIG. 1.

Referring now to FIG. 2, a detailed block diagram of an application encapsulator 16 of FIG. 1 is shown. To make inaccessible processes at participating workstations accessible, a listener 18, a replica 20, and a mapper 22 are used in each encapsulator 16. These elements automatically: (1) observe a process state; (2) map dynamically created child windows; (3) create the replica 20 when the accessible process becomes inaccessible in the floor holder encapsulator; and (4) multicast input events to the corresponding inaccessible processes at participant workstations so as to simultaneously execute the same window processes across the system.

Figure 3:
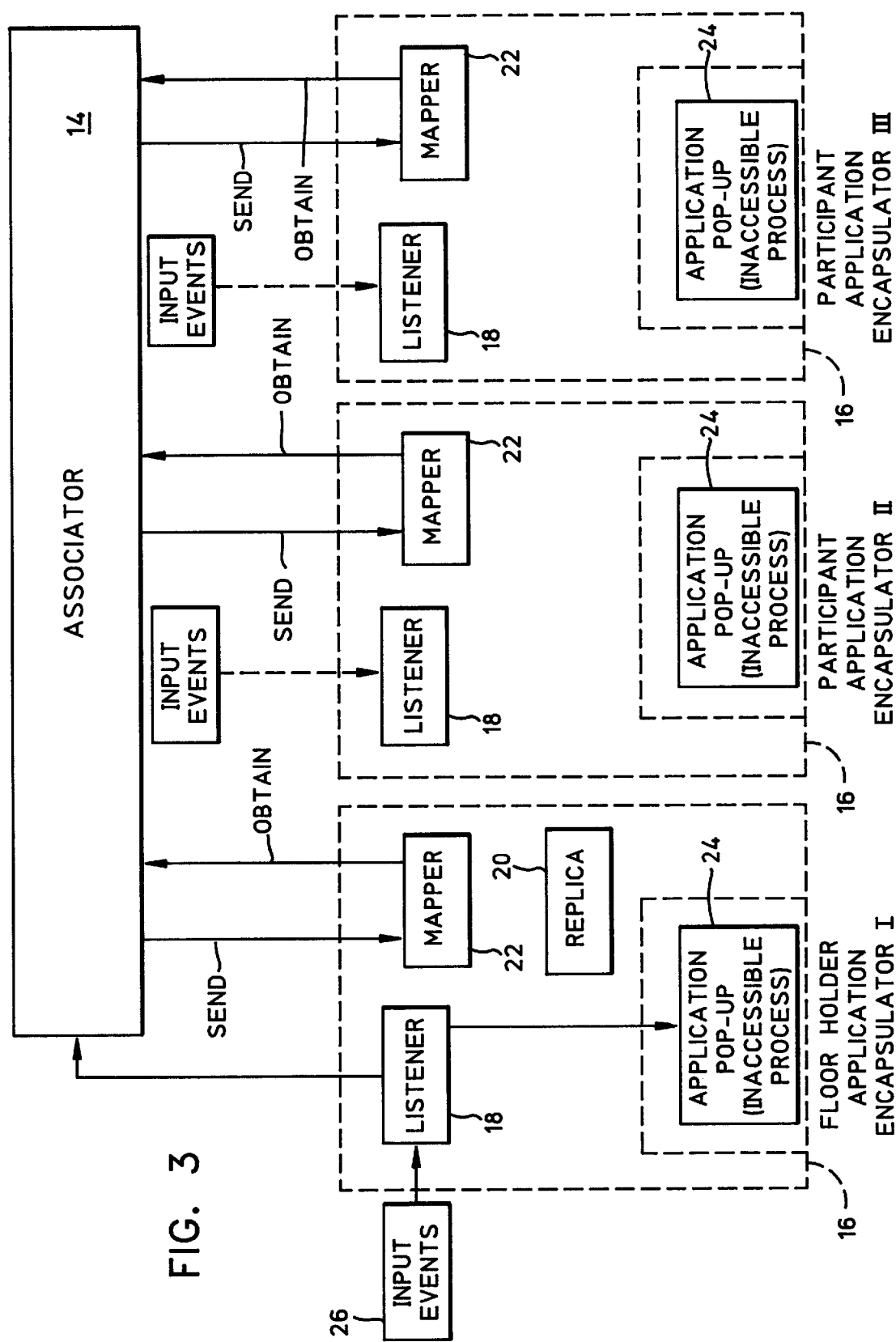
FIG. 3 is a detailed block diagram of the system of FIG. 1.

Referring now to FIG. 3, a detailed block diagram of the system 12 of FIG. 1 is shown. The application encapsulator 16 receives an input event 26 defined as communications around an inaccessible process application pop-up 24 at the floor holder workstation. The application encapsulator 16 receives and transmits data in the format and protocol used by the application pop-up. Thus, the encapsulator can operate in conjunction with an existing application without recompiling, relinking, or modifying the existing application program. It is important that all elements in the application encapsulator 16 operate independently of the existing application so that the system 12 is operable with different existing applications without modifying application software The application encapsulator 16 sends and receives input events 26 between the application pop-up 24 and existing applications, The listener 18 monitors process status changes, such as a process state change from inaccessible to accessible or vice versa, and maintains the consistency of the application inaccessible process at different workstations. The mapper 22 performs mapping and indexing to provide concurrent execution among all encapsulators for consistent system control, that is, it maps dynamically created hierarchial child window tree structures for sharing hidden processes. The replica 20 provides virtual extensions of the application pop-up process for the floor holder workstation and resumes application pop-up functions after the application pop-up becomes inaccessible. The replica 20 exists only on the floor holder application encapsulator. The replica does not appear on the participant encapsulators.

The user input event 26 automatically triggers concurrent execution of the same event on the other existing applications in the system, such as execution of a "cut" function of an "edit" command in a 3D-icon menu. The lifetime of the replica 20 is bounded by the lifetime of the inaccessible processes of the application pop-up 24. The replica on a window ceases to appear at the completion of the application pop-up execution.

The associator 14 interacts with the encapsulator 16 on each participant workstation to provide concurrent execution of inaccessible processes. The associator is an external functional aspect of the network server that implements a dynamic indexing scheme to index and map the application pop-up from the replica 20 at the floor holder workstation to corresponding processes at participant workstations. The associator can reside on the network server or be an independent functional mechanism at each remote workstation in the system.

The system performs the following three basic operations:

Listening: The listener 18 exists in three states necessary for sharing inaccessible processes using the application pop-up 24 to ensure that activities at each encapsulator 16 are executed concurrently at remote workstations. The states are as follows:

1. State 1 is an idle state where no activity occurs. The pop-up application menu is inaccessible and not viewable. The listener 18 awaits a state change from the user input event 26 to perform a task.
2. State 2 is a process change from the inaccessible state to an accessible state after an input event 26 occurs. The associator 14 similarly obtains the process window hierarchy tree structure for mapping from the mapper 22.
3. State 3 is a process change from the accessible state to an inaccessible state after an input event 26 concludes. The mapper 22 of the floor holder encapsulator 16 dynamically creates a replica 20 to resume the inaccessible processing.

Dynamic Process Mapping: The associator 14 performs the following functions upon receipt of an input event 26 from a listener 18 of the floor holder encapsulator 16 when the input event represents a process state change from inaccessible to accessible states:

1. Receives the process window hierarchy structure and attributes from the mapper 22 in the floor holder encapsulator I in the form of an "OBTAIN" signal.
2. Sends the inaccessible processing structures of window attributes and states of the floor holder encapsulator I, for example, size, accessible, viewable, or time, to the participant encapsulators in the form of a "SEND" signal. This dynamic window mapping does not require a user at remote participant workstations to initiate application pop-up function on a sharing window.
3. Creates a replica 20 in the floor holder encapsulator I with the same attributes and process functioning that resume after the process functioning on the floor holder encapsulator I becomes inaccessible.
4. Builds an indexing scheme to correlate all participant workstations inaccessible processes. This process is generated dynamically in real-time.

Inaccessible Processing: The associator 14 performs mapping and indexing to ensure all of the participant workstations execute the same inaccessible process input events as the floor holder workstation. This ensures that the floor holder workstation controls changes being performed on existing applications. When the accessible process becomes inaccessible, the associator 14 uses a replica 20 to resume the inaccessible process function on the floor holder workstation while invoking the same function at the participant workstations.

Figure 4:
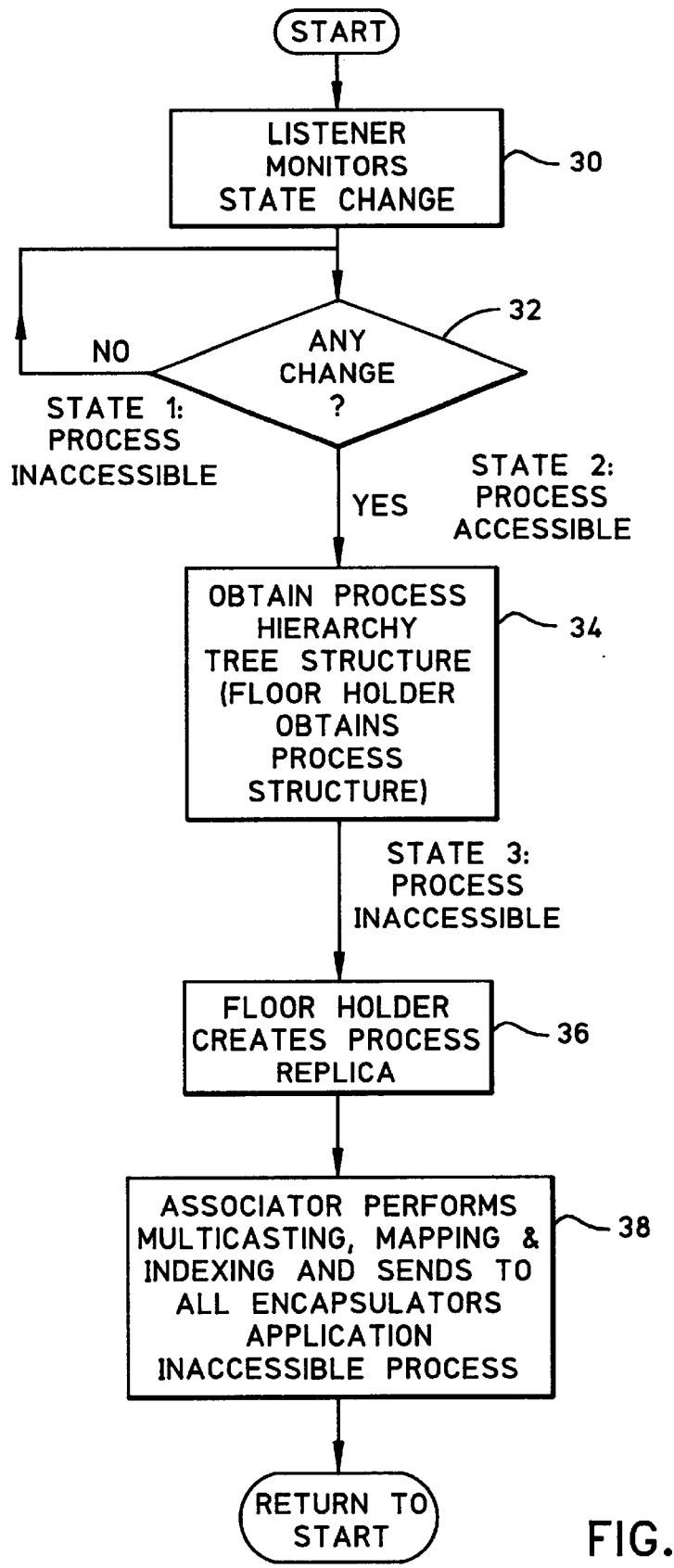
FIG. 4 is a flow diagram of the processing of input events by the system of FIG. 1.

Referring now to FIG. 4, a flow diagram of the processing of input events 26 by the system 12 of FIG. 1 is shown. In blocks 30 and 32, the listener 18 monitors state changes of one of the states described above. When there is an input event 26, the process proceeds to block 34 where the associator requests the process hierarchy tree structures from the mapper 22 of a floor holder encapsulator in the form of an "OBTAIN" signal. The process then changes to an inaccessible state after the input event 26 ceases. The associator 14 creates and uses the replica 20 in block 36 when the accessible process becomes inaccessible. Then in block 38, the associator 14 multicasts the input events 26 of the replica 20 to the inaccessible process at participant workstations in the form of a "SEND" signal so as to simultaneously execute the same window processes across the system dynamically in real-time.

Figure 5:
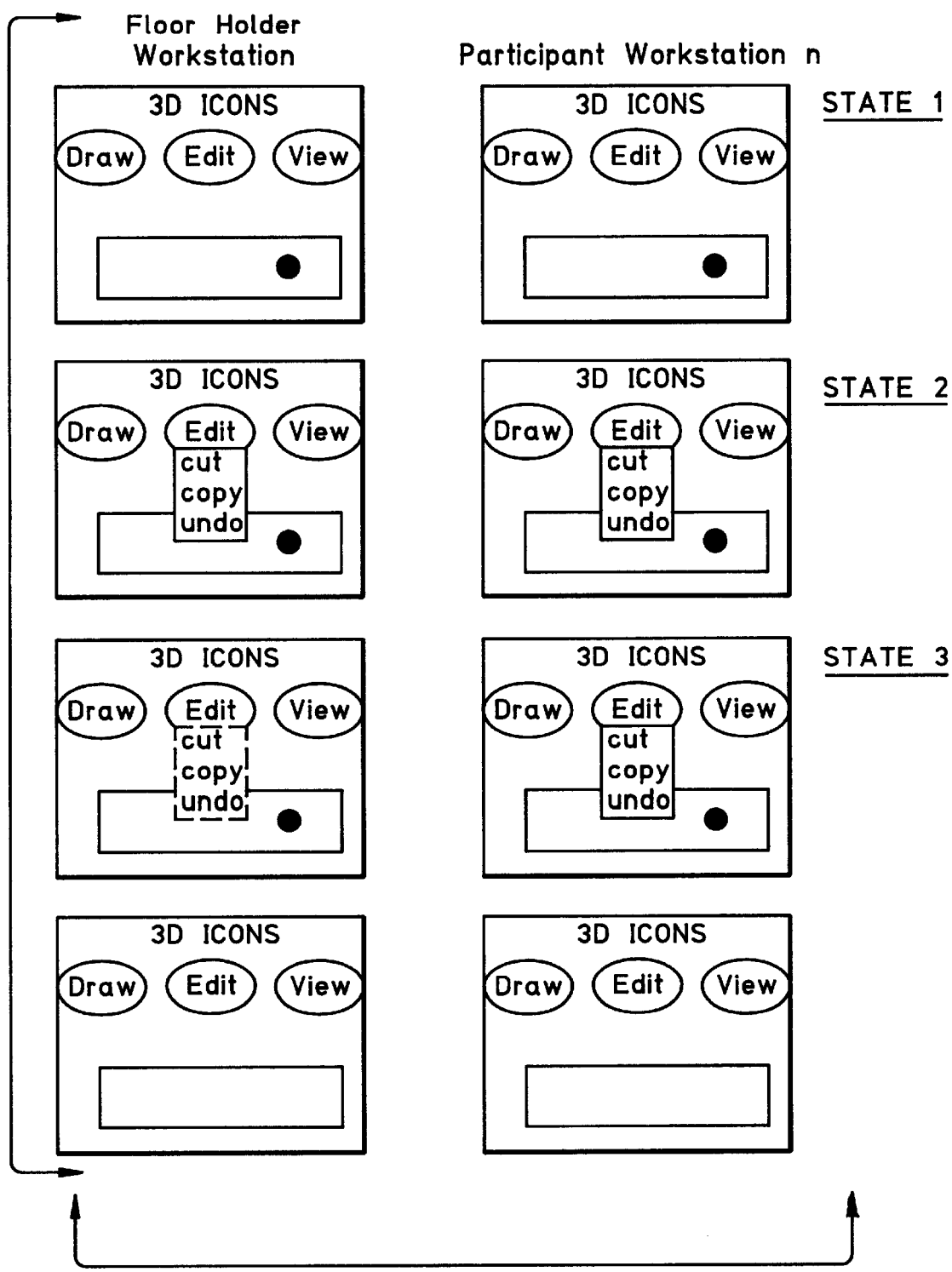
FIG. 5 is a block diagram of an example inaccessible process according to the present invention.

Referring to FIG. 5, a block diagram of an example inaccessible process according to the present invention is shown. In this example, a user wishes to remove a dot from the current design on a group of participating workstations. The user is operating the floor holder workstation. A user begins with the input event 26 of clicking on an inaccessible process 24 menu icon to select a "cut" function to remove the dot. Each state listed in FIG. 5 requires one cycle of processing as shown in FIG. 4.

During state 1, the "edit" menu pop-up is inaccessible and not viewable and in an idle state. During state 2, a user generates an input event 26 by clicking on the "edit" command, which is representative of an application inaccessible process pop-up, and each participant workstation correspondingly has an inaccessible process pop-up menu appear. Before the floor holder process state returns to inaccessible from accessible, the associator requests the process hierarchy tree structures from the mapper. During state 3, the floor holder workstation creates the replica (in dashed lines) to resume the inaccessible process function. The floor holder clicks on the "cut" command for the replica to delete the dot present in the window. Each of the participant workstations process the "cut" command after they receive a multicast from the floor holder workstation to the button release event sent from the floorholder workstation. Afterwards, the dot is removed from both the floor holder and participant workstations windows and the task is completed.

The invention taught herein supports virtual co-location strategies by ensuring graphic consistency before processing a subsequent user input event to modify an existing application graphical design. The invention provides for the sharing and executing of inaccessible dynamic existing processes for replica consistency among multiple applications in a shared network. For graphical applications, the invention automatically ensures 3-D graphical replication among multiple existing applications across a network. The invention can also be used with text applications alone or combined with the 3-D CAD/CAM graphical applications to ensure that a network having client-server hardware use a database with consistent and concurrent information, without the need for modifying the system.

Having described and illustrated the principles of the invention in a preferred embodiment thereof, it should be apparent that the invention can be modified in arrangement and detail without departing from such principles. We claim all modifications and variation coming, within the spirit and scope of the following claims and equivalents thereof

What is claimed is:

1. A system for sharing an inaccessible dynamic process among multiple workstations of a replicated architecture network whereby local activities are executed at remote locations, the system comprising:

multiple application encapsulators wherein: one of the encapsulators is distributed to each of the multiple workstations each having an existing application, each of the encapsulators operates with the existing application; and one of the encapsulators is designated as the floor holder encapsulator and the remaining of the encapsulators are designated as participant encapsulators; and an associator that receives and transmits between each of the encapsulators a shared inaccessible process generated at the floor holder encapsulator.

2. The system according to claim 1, wherein each of the encapsulators comprises a listener that monitors process status change of input events and transmits the same to the associator.

3. The system according to claim 2, wherein each of the encapsulators comprises a mapper that maps and indexes inaccessible processes of the encapsulators.

4. The system according to claim 3, wherein the mapper of the floor holder encapsulator comprises means for generating an "OBTA1N" signal for transmitting a process window hierarchy tree structure to the associator.

5. The system according to claim 4, wherein the associator comprises means for generating a "SEND" signal for multicasting the process window hierarchy tree structure of the floor holder encapsulator to the mapper of each participant encapsulator.

6. The system according to claim 1, wherein the floor holder encapsulator generates a replica that functions when the shared inaccessible processing resumes and multicasting occurs at participant encapsulators of corresponding process mapping structures.

7. The system according to claim 1, wherein each of the existing applications comprise existing multi-dimensional display programs and the associator and the encapsulators communicate and transfer user input events independently of the multi-dimensional display programs.

8. The system according to claim 1, wherein at least two of the encapsulators and the associated existing applications are loaded on workstations located in different physical locations and the associator is located at a third location selectively accessible from each workstation location over the network.

9. A method of sharing an inaccessible dynamic process among multiple workstations of a replicated architecture network wherein each workstation has an existing application, the method comprising the steps of:

receiving at least one input event from the user of one of the existing applications;

requesting an inaccessible process window hierarchy tree structure when the process becomes accessible;

generating a replica when the process becomes inaccessible; and multicasting the at least one input event of the replica.

10. A system for sharing an inaccessible dynamic process among multiple workstations of a replicated architecture network wherein each workstation has an existing application, the system comprising:

means for receiving at least one input event from the user of one of the existing applications;

means for requesting an inaccessible process window hierarchy tree structure when the process becomes accessible;

means for generating a replica when the process becomes inaccessible; and means for multicasting the at least one input event of the replica.

* * * * *